United States Patent
Johnson et al.

(10) Patent No.: US 9,433,190 B2
(45) Date of Patent: Sep. 6, 2016

(54) ANIMAL WATERING VALVE

(71) Applicant: Edstrom Industries, Inc., Waterford, WI (US)

(72) Inventors: Paul S. Johnson, Muskego, WI (US); Randal S. Knurr, Waterford, WI (US); Peter Steven Planton, Muskego, WI (US); Russell F. Kuzniar, Elkhorn, WI (US)

(73) Assignee: Edstrom Industries, LLC, Waterford, WI (US)

( * ) Notice: Subject to any disclaimer, the term of this patent is extended or adjusted under 35 U.S.C. 154(b) by 460 days.

(21) Appl. No.: 13/798,319

(22) Filed: Mar. 13, 2013

(65) Prior Publication Data

US 2014/0261218 A1    Sep. 18, 2014

(51) Int. Cl.
*A01K 7/06* (2006.01)
*A01K 39/02* (2006.01)

(52) U.S. Cl.
CPC ............. *A01K 7/06* (2013.01); *A01K 39/0213* (2013.01); *Y10T 137/86775* (2015.04)

(58) Field of Classification Search
CPC ........................... A01K 7/06; A01K 39/0213
See application file for complete search history.

(56) References Cited

U.S. PATENT DOCUMENTS

| | | | |
|---|---|---|---|
| 3,550,560 A * | 12/1970 | Edstrom | 119/72.5 |
| 4,338,884 A * | 7/1982 | Atchley et al. | 119/72.5 |
| 4,402,343 A * | 9/1983 | Thompson et al. | 137/614.2 |
| 4,589,373 A * | 5/1986 | Hostetler et al. | 119/72.5 |
| 4,890,578 A * | 1/1990 | Rader | 119/72.5 |
| 5,065,700 A * | 11/1991 | Cross | 119/72.5 |
| 5,301,635 A * | 4/1994 | Rovira Badia et al. | 119/72.5 |
| 5,327,853 A * | 7/1994 | Hostetler | 119/72.5 |
| 5,337,696 A | 8/1994 | Edstrom et al. | |
| 5,501,177 A | 3/1996 | Edstrom, Sr. et al. | |
| 6,003,468 A | 12/1999 | Edstrom, Sr. et al. | |
| 6,058,881 A * | 5/2000 | Thompson | 119/72.5 |
| 6,901,881 B2 * | 6/2005 | Pollock et al. | 119/72.5 |
| 7,810,787 B2 | 10/2010 | Johnson | |
| 2003/0085372 A1* | 5/2003 | Newton | 251/149.1 |
| 2006/0096546 A1* | 5/2006 | Welbourne | 119/75 |
| 2007/0245969 A1* | 10/2007 | Johnson | 119/72.5 |

OTHER PUBLICATIONS

QC Supply Webpage, Nipple Waterers—Waterers—Farm & Livestock, http://www.qcsupply.com/farm-livestock/waterers/nipplewatters.html?p=.
Edstrom, Inc. Animal Watering Valves, circa 1983.

* cited by examiner

*Primary Examiner* — Craig Schneider
*Assistant Examiner* — Frederick D Soski
(74) *Attorney, Agent, or Firm* — Boyle Fredrickson, S.C.

(57) ABSTRACT

An animal watering valve that includes a housing having an internal bore having an upstream inlet and a downstream outlet. The housing includes a downstream guard and an upstream cap. The valve is actuated by deflecting a valve stem, located in the bore and accessible by the animal, to open a valve within the housing. The valve may be located in a valve cartridge retainable in the housing in a snap-fit manner. A bite-resistant shield cooperates with the valve stem to act as a barrier that prevents an animal from forcing materials between the valve stem and the guard and lodging the valve stem in its deflected or actuated position.

19 Claims, 10 Drawing Sheets

ANIMAL WATERING VALVE

BACKGROUND OF THE INVENTION

1. Field of the Invention

The invention generally relates to animal watering valves and, more particularly, relates to animal actuated valves for use by mice, rats, and other relatively small laboratory animals or commercially raised animals.

2. Discussion of the Related Art

Animal actuated watering valves are well known. One such valve is disclosed in U.S. Pat. No. 7,810,787, which issued to Edstrom Industries, Inc. on Oct. 12, 2010 (the Edstrom patent). The valve disclosed in the Edstrom patent employs a housing having an inlet and an outlet connected by an elongated longitudinal bore, a valve located adjacent the inlet, and an elongated actuating lever or valve stem which extends through the bore, which projects out of the outlet, and which, when deflected by an animal, opens the valve to permit the passage of fluid through the valve housing. A shield in the form of a movable elastomeric boot is provided adjacent the outlet to inhibit the animal from stuffing bedding material or other debris into the outlet and thus inhibits the valve from being unintentionally lodged in its open position.

The valve disclosed in the Edstrom patent includes a head on the valve stem which is resiliently biased against a valve seat by an elastomeric diaphragm. The valve seat takes the form of an elastomeric ring against which a downstream surface of the valve stem head abuts. The diaphragm is formed from a unitary elastomeric element including a central web portion and a cylindrical peripheral portion. The web portion has apertures formed therethrough for the passage of fluid, and also has a recess counter-bored into the downstream surface thereof for receiving a head of the valve stem. A downstream end of the outer peripheral portion is clamped in place within the housing, and an upstream, second end engages a shoulder on the valve cap.

The valve disclosed in the Edstrom patent works very well but exhibits some disadvantages. For example, the housing of the valve of the Edstrom patent does not allow for easy disassembly for cleaning or performing maintenance on the valve.

In addition, while the Edstrom patent recognizes the desirability of providing a shield to prevent the animal from stuffing bedding material into the valve, the disclosed movable elastomeric boot is still susceptible to tampering by the animal stuffing bedding therebetween and/or by being torn by the animal's teeth.

The need therefore exists to provide a valve assembly that is easier to assemble, maintain, and clean than existing animal watering valves.

The need additionally has arisen to provide a valve assembly that prevents animals from stuffing bedding material into the valve and leaving the valve in an actuated position.

SUMMARY OF THE INVENTION

In accordance with a first aspect of the invention, an animal watering valve is provided that includes a housing having an upstream inlet and a downstream outlet. The housing includes a downstream guard and an upstream cap. The valve is actuated by deflecting a valve stem, located in a longitudinal bore in the valve and directly or indirectly accessible by the animal from the downstream end of the valve, to open a valve within the housing. A bite-resistant shield cooperates with the valve stem to act as a barrier that prevents an animal from forcing materials between the valve stem and the guard and lodging the valve stem in its deflected or actuated position. At least part of the shield is positioned downstream of an outlet of the longitudinal bore.

The housing may define a cavity configured to securely receive a valve cartridge assembly. The valve cartridge assembly according to this aspect of the invention includes a valve seat such as an o-ring, an elastomeric diaphragm, and a valve stem. The elastomeric diaphragm is disposed in the bore upstream of the valve seat and includes perforations or the like for allowing water to pass therethrough. The valve stem is located in the bore and extends from the diaphragm toward the outlet. The valve stem head is clamped between the diaphragm and the valve seat and includes a lever that is upwardly deflectable to move the valve stem head relative to the diaphragm form a seated position to an unseated position.

In one exemplary embodiment, the shield is provided between the guard and the cartridge assembly to seal the downstream end of the valve to prevent debris from entering the valve and the animal from accidentally actuating the valve stem by stuffing bedding into the valve. Moreover, the shield is configured to provide a seal around the cartridge assembly to prevent water from reentering the valve and flowing back around the outside of the cartridge.

In another exemplary embodiment, the shield includes a flexible sheath that at least partially covers the valve stem in order to provide a seal between the guard and the cartridge assembly. The flexible sheath may be partially covered by a rigid cap. The cap may include a number of apertures to permit water to flow through the cap.

In still another exemplary embodiment, the shield may comprise a flexible membrane through which the valve stem extends and which is received over an opening of the guard. The flexible membrane may be a screen or other durable yet water permeable element configured to allow water to pass therethrough. The flexible membrane may be selectively deflectable with the valve stem to actuate the valve.

In another exemplary embodiment, the valve stem is actuated by a vertically oriented actuator. The vertically oriented actuator is accessible to the animal for selective actuation, but the valve stem is enclosed and sealed off from the animal by shield in the form of a rigid cover at the downstream end of the valve to prevent the animal from stuffing bedding material into the valve.

In still another exemplary embodiment, the shield takes the form of a rotatable ball through which the valve stem lever extends. The ball forms a seal between the valve stem and the guard. The ball is configured to rotate upon deflection of the valve stem lever to permit water to pass through the valve and out the outlet.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

At least some of the animal watering valves described herein and other animal watering valves falling within the scope of the present invention may be used to deliver water to animals in cages or other environments from a number of different sources including bottles, bags, and manifolds. It is to be understood that the following discussion of valves in use on a cage and rack system supplied with water via a manifold is provided strictly by way of example.

Figure 1:
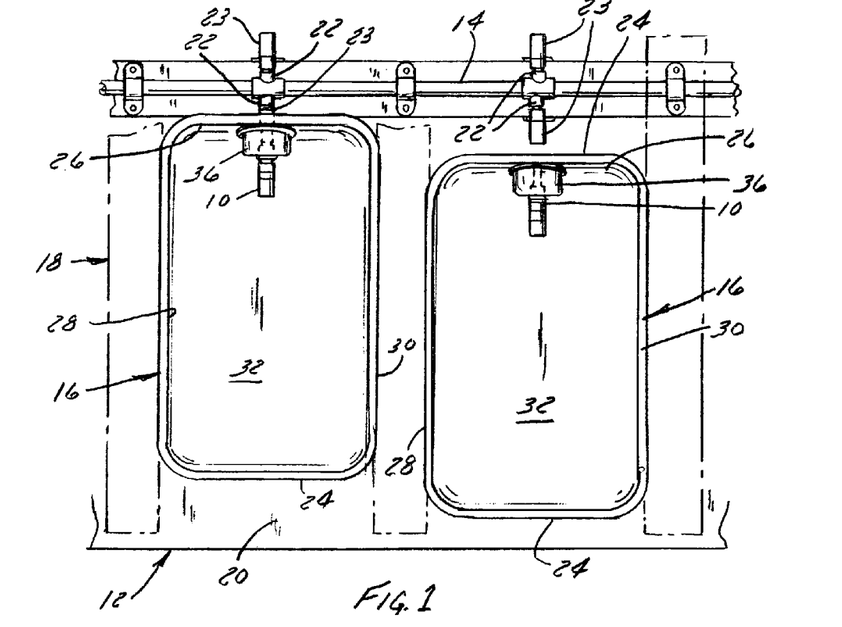
FIG. 1 is a fragmentary top plan view of a portion of a cage and rack system utilizing animal watering valves constructed in accordance with the invention.
Figure 2:
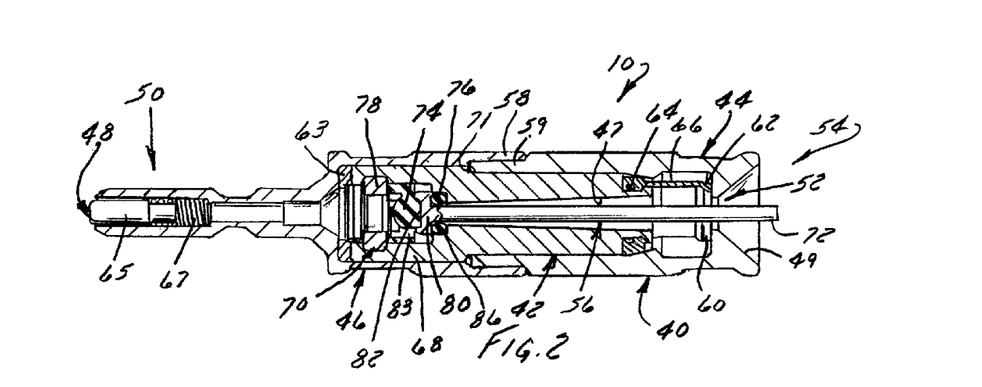
FIG. 2 is a sectional side elevation view of a first embodiment of an animal watering valve usable in the cage and rack system of FIG. 1, showing the valve in a closed position.
Figure 3:
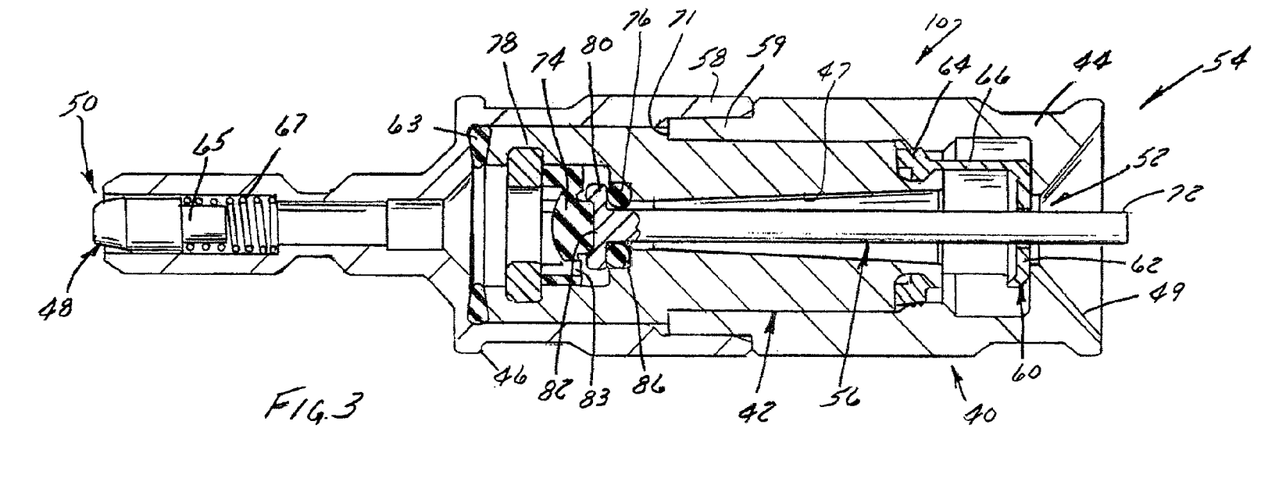
FIG. 3 is a sectional side elevation view of the valve of FIG. 2, showing the valve in an open or actuated position.

With reference now to the drawings, and initially to FIG. 1 and also to FIG. 2, a cage and rack system with which the various animal watering valves 10 disclosed herein are usable includes a rack 12, a water manifold 14, and a number of cages 16. As is conventional, the rack 12 includes a support frame 18 and a number of shelves 20 (only one of which is shown) mounted on the support frame 18 and on which the cages 16 are supported. The shelves 20 are arranged in vertically spaced rows are preferably, but not necessarily, provided in each row in back-to-back relationship.

The water manifold 14 and associated supply and drain valves (not shown) also may be conventional and likewise will not be described in detail. A number of nipples 22 extend outwardly from the water manifold 14 toward the cages 16 for supplying water to the individual watering valves 10, preferably via quick-connect couplings 23 provided at the downstream ends of the nipples 22. Various techniques may be employed to connect the watering valves to the supply manifold.

Figure 14:
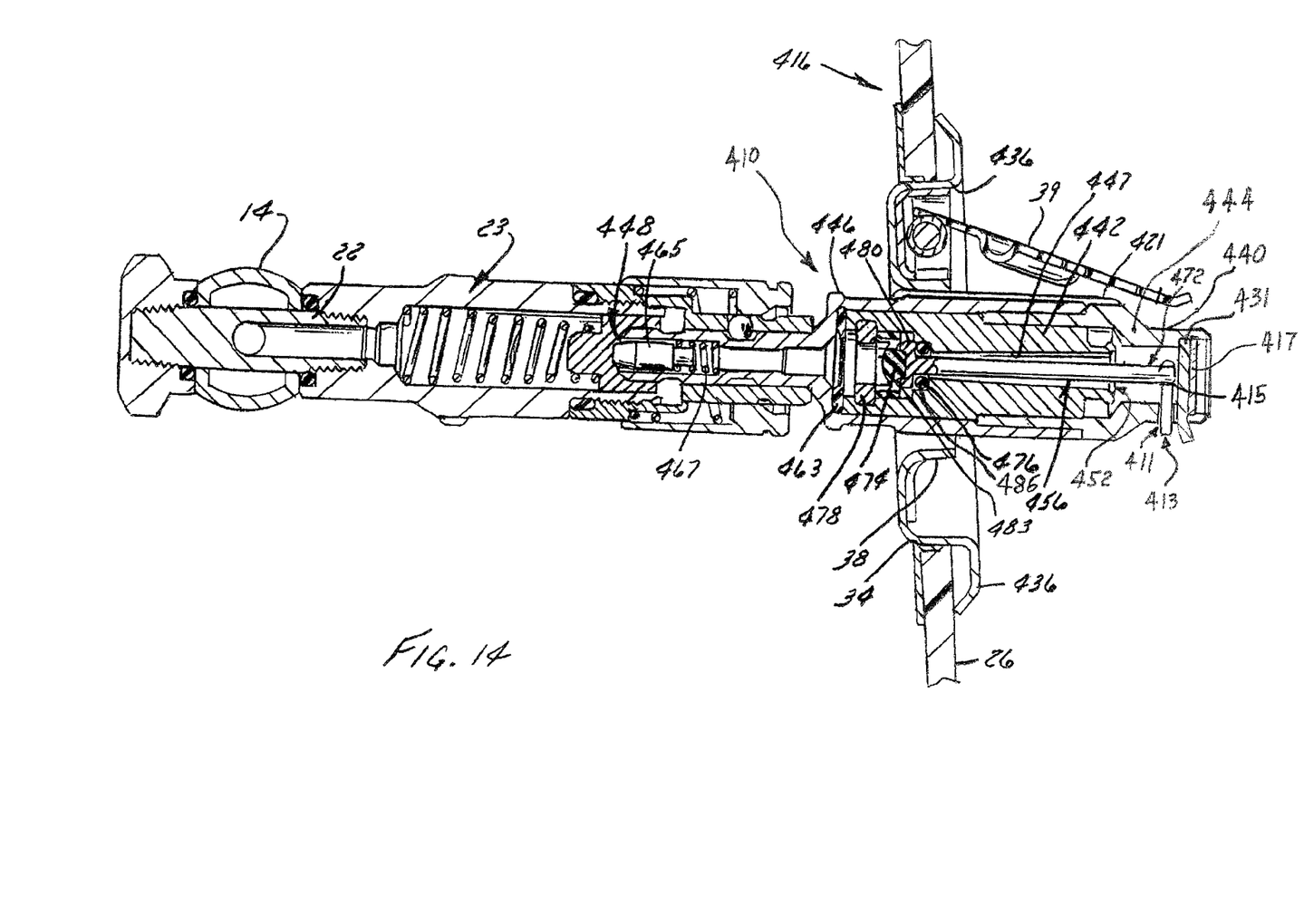
FIG. 14 is a side sectional view of an animal watering valve constructed in accordance with another embodiment of the invention, showing the valve inserted through the wall of a cage and mating with the water manifold of FIG. 1 and showing the valve in a closed position.
Figure 15:
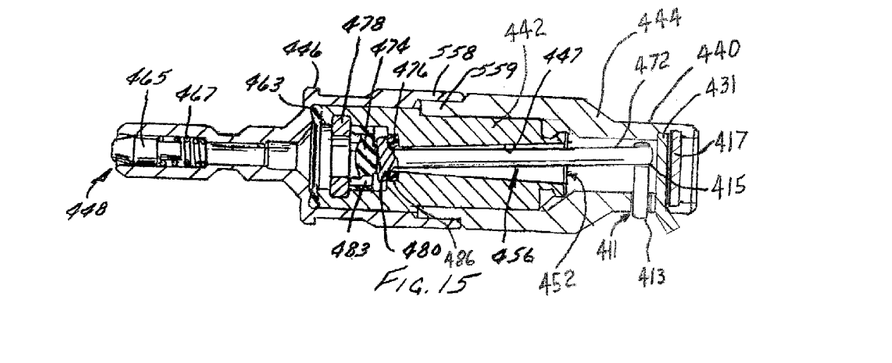
FIG. 15 is a side sectional view of the animal watering valve of FIG. 14, showing the valve in an actuated or open position.

The cages 16 may also be conventional and include front and rear end walls 24 and 26, respectively, a pair of opposed side walls 28 and 30 connecting the end walls 24 and 26 to one another. Each of the cages 16 additionally includes an enclosed base 32. The rear wall 26 of the base of each cage 16 has an opening 34 (see FIG. 14) formed therein for accommodating a grommet 36. The grommet 36 has an opening 38 formed therethrough for accommodating the associated watering valve 10 as shown in FIG. 14. The opening 38 may be electrically closed by the spring loaded flap 39 also shown in FIG. 14.

With additional reference now to FIGS. 2-7, a first embodiment of the animal watering valve 10 in accordance with the invention includes a housing 40 assembled in a snap-fit manner as will be described herein and a cartridge assembly 42 retained within the housing 40. The housing 40 includes a downstream guard 44 and an upstream cap 46. A bore 47 extends longitudinally of the housing. The bore 47 has an inlet 48 formed in an upstream end of the cap 46, and an outlet 52 formed in a downstream end portion of the guard 44. The outlet 52 is recessed into an end of the guard 44. A flared opening 49 is formed in the guard 44 downstream of the outlet 52 and is shaped and sized to accommodate the snout of an animal. The housing 40 preferably is constructed from a metal, although other suitable materials may be used, and defines an upstream end 50 and opposing downstream end 54.

Figure 4:
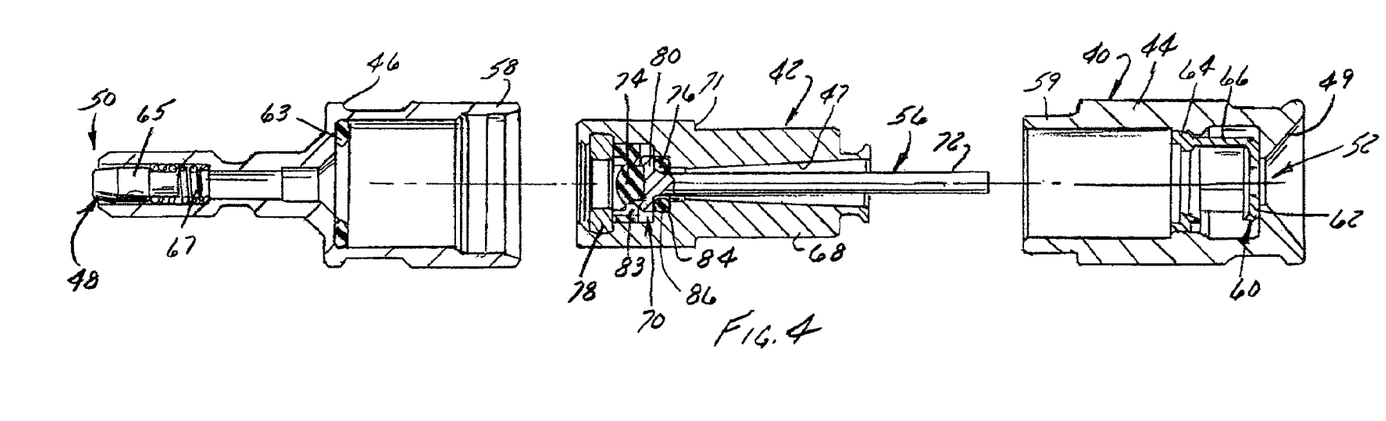
FIG. 4 is a sectional side elevation view of the valve of FIGS. 2 and 3, showing the valve in a partially assembled condition
Figures 5, 6:
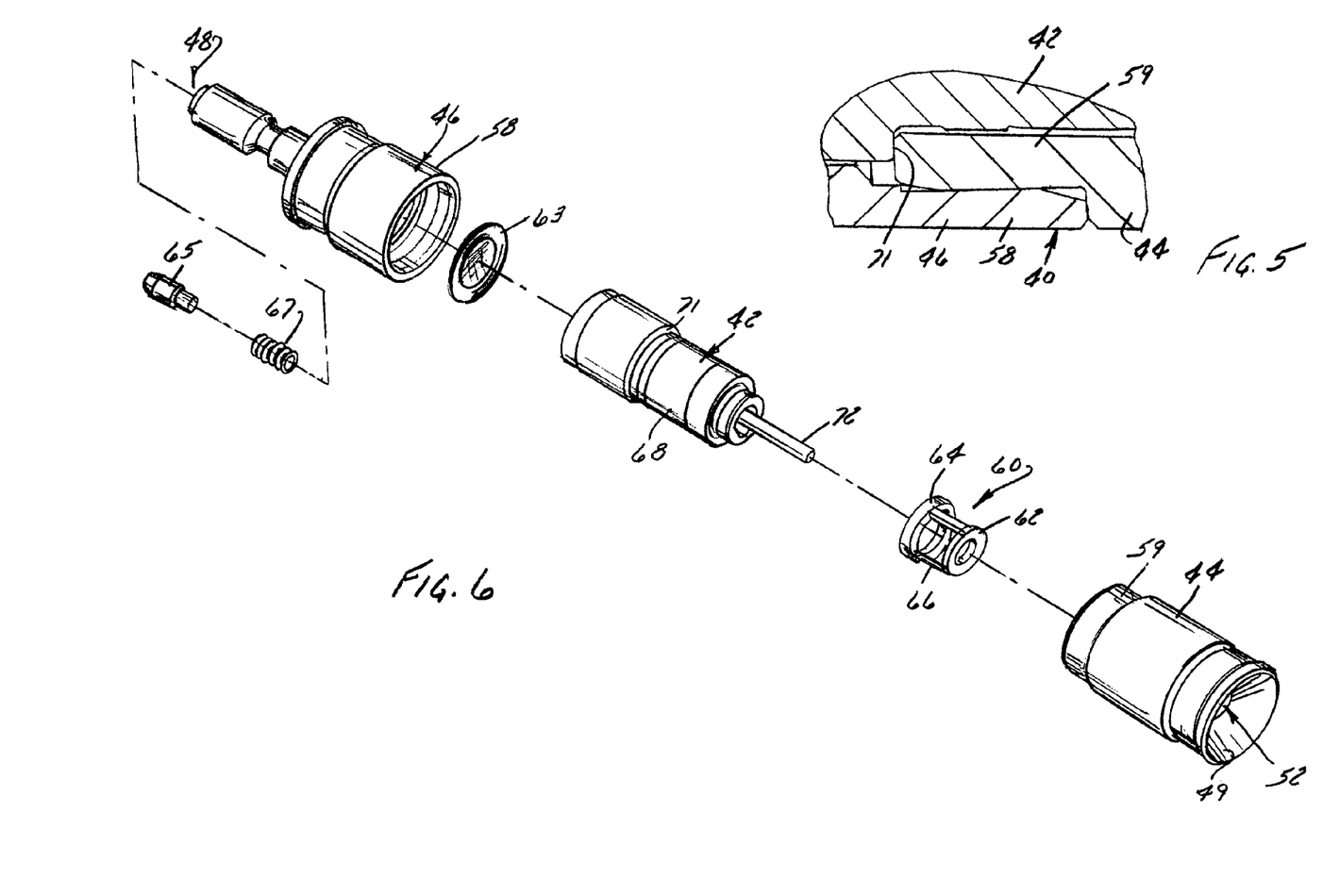
FIG. 5 is an enlarged fragmentary sectional side elevation view of a portion of the valve of FIGS. 2-4.
FIG. 6 is an exploded perspective view of the valve of FIGS. 2-5.

With particular reference now to FIGS. 4 and 6, the guard 44 is generally cylindrically shaped and may be configured to limit the stroke of a valve stem 56 as will be described herein. The guard 44 is further configured to prevent debris from entering the valve 10 and to provide a surface configured to deliver water to the animal. The guard 44 includes openings at its downstream and upstream ends. The guard 44 further defines a cavity between the downstream and upstream ends and is configured to cooperate with the cap 46 to receive the cartridge assembly 42. The upstream end terminates in a cylindrical projection 58 that snap fits within an upstream end 59 of the guard 44, with or without a snap ring, with the cartridge assembly clamped therebetween. Alternatively, the projection 58 could be externally threaded so as to mate with internal threads on the cap 46. A shield 60 is received within the downstream end of the guard 44 and is configured to act as a barrier that prevents debris from being inserted into the outlet 52 and accidental actuation of the valve 10 by the animal. The shield 60 of this embodiment is preferably constructed from silicone but may be constructed from other suitable materials. The shield 60 further provides a seal around the cartridge assembly 42 to prevent water from flowing back in around the cartridge assembly 42. The shield 60 includes a downstream and an upstream annular element 62 and 64, respectively, connected together by a number of longitudinally extending supports or posts 66. Annular element 62 acting as a seal between guard 44 and cartridge 42 is a unique use of the shield 60.

The cap 46 defines a generally cylindrical downstream end opposite a generally narrower cylindrical upstream end adapted for coupling to the water manifold 14 in a conventional manner. The downstream end defines a cavity, which cooperates with the cavity of the guard 44 for receiving the cartridge assembly 42. An elastomeric seal 63 is captured between an upstream end of the cavity and an end of the cartridge assembly 42. The seal 63 may include a control screen mesh, fiber filter, or sintered metal filter configured to keep debris from entering the cartridge assembly 42. The seal 63 may also work as a flow control element for the drinking valve 10. A check seat 65 and spring 67 are receivable within the narrower upstream end of the cap 46 and are configured to prevent debris from entering the valve 10 through the inlet 48. Alternatively, check seat 65 and spring 67 could be replaced with a filter or screen of any of various designs to prevent debris from entering the valve 10. In another alternative construction of the valve 10 of the present embodiment, configured for use with a bottle or bag watering connection, the check seat 65 and spring 67 may be eliminated.

Figure 7:
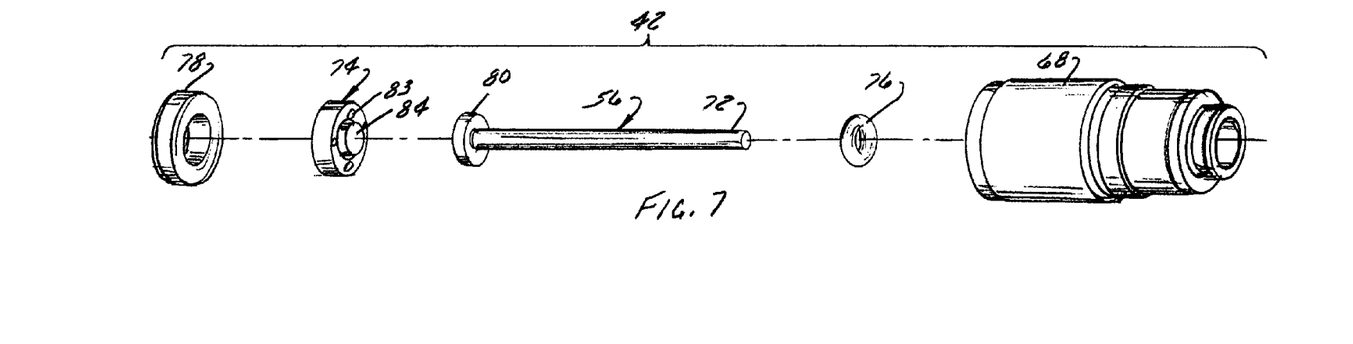
FIG. 7 is an exploded perspective view of the cartridge of the valve of FIGS. 2-6.

With continuing reference to FIGS. 2-7 and particular reference to FIGS. 4 and 7, the cartridge assembly 42 comprises a generally cylindrical cartridge housing 68 and a valve assembly 70 housed within the cartridge housing 68. The cartridge housing 68 may be formed of plastic or a metal such as stainless steel. It has an outer circumference that generally tapers from an upstream end toward a downstream end and that includes apertures on each end thereof. The cartridge housing 68 is configured to encapsulate the other components of the cartridge assembly 42 as will be described and to be held in place within the housing 40 by engaging the seal 63 at its upstream end and the end 59 of the guard 44 at a shoulder 71 thereof as best seen in FIG. 5. A stepped bore extends axially through the center of the cartridge housing 68 from an upstream end to a downstream edge thereof and forms part of the bore 47. The downstream portion of the bore houses the valve stem lever 72 (described below) and is tapered so as to gradually narrow from the downstream end thereof. In this manner, the lever 72 has a greater amount of "play" in a direction substantially perpendicular to the longitudinal axis of the valve 10 at its downstream end to accommodate lever deflection.

The valve cartridge assembly 42 comprises the valve stem 56, a diaphragm 74, a valve seat, and a retainer 78. The valve stem 56 includes a head portion 80 disposed at an upstream end of the cartridge assembly 42 and a lever 72 extending downstream from the head portion 80 and out of the valve 10. The head portion 80 of the valve stem 56 includes recess 82 on an upstream facing portion thereof configured to receive a portion of the diaphragm 74. In particular, the diaphragm 74 includes a central protrusion 84 extending downstream from the remainder of the diaphragm 74 that is configured to be received within the recess 82. The diaphragm 74 has apertures 83 formed therethrough to allow water flow when the valve 10 is opened. The valve seat, which typically comprises an o-ring 76, includes an aperture configured to receive the lever 72 of the valve stem 56 therethrough. The o-ring 76 is configured to be received in an abutting manner with a downstream end of the head portion 80 of the valve stem 56 and to rest on a step or valve seat 86 formed by the step in the bore of the cartridge housing 68. The o-ring 76 provides an elastomeric seal between the valve seat 86 and the valve stem 56. The valve stem head 80 lifts off the o-ring 76 upon lever 72 deflection to allow water to flow though the valve 10.

The retainer 78, which may be formed of metal such as stainless steel or a rigid plastic, is configured to house the o-ring 76, head portion 80 of the valve stem 56 and the diaphragm 74 in a relatively secure manner. The retainer 78 is mounted in or on the cap 46 and retains the diaphragm 74 and valve stem 56 in place within the housing. In the illustrated embodiment, the retainer comprises a cartridge valve cap 78 that may be coupled to the cartridge housing 68 by any of a number of techniques, including but not limited to, thermo fitting, ultrasonic welding, snap fitting, threads, and staking.

In operation, an animal drinking from the valve 10 of the present embodiment deflects the lever 72 of the valve stem 56 with its tongue or snout. The deflection of the lever 72 moves the valve stem head 80 relative to the diaphragm 74 from a seated position in which water is prevented from flowing through the valve 10 to an unseated position in which water flow is permitted. In particular, upon moving the valve stem 56 from its seated position in which the valve stem 56 head seals against the o-ring 76 to prevent water flow through the valve 10, to an unseated position in which the valve stem 56 head pivots relative to the valve seat 86 to permit water flow through the diaphragm 74, between the valve stem head 80 and the o-ring 76, and out of the valve 10. The valve stem 56 pivots back to its seated position under the elastomeric return forces imposed by the diaphragm 74, preventing further water flow through the valve 10.

Figure 8:
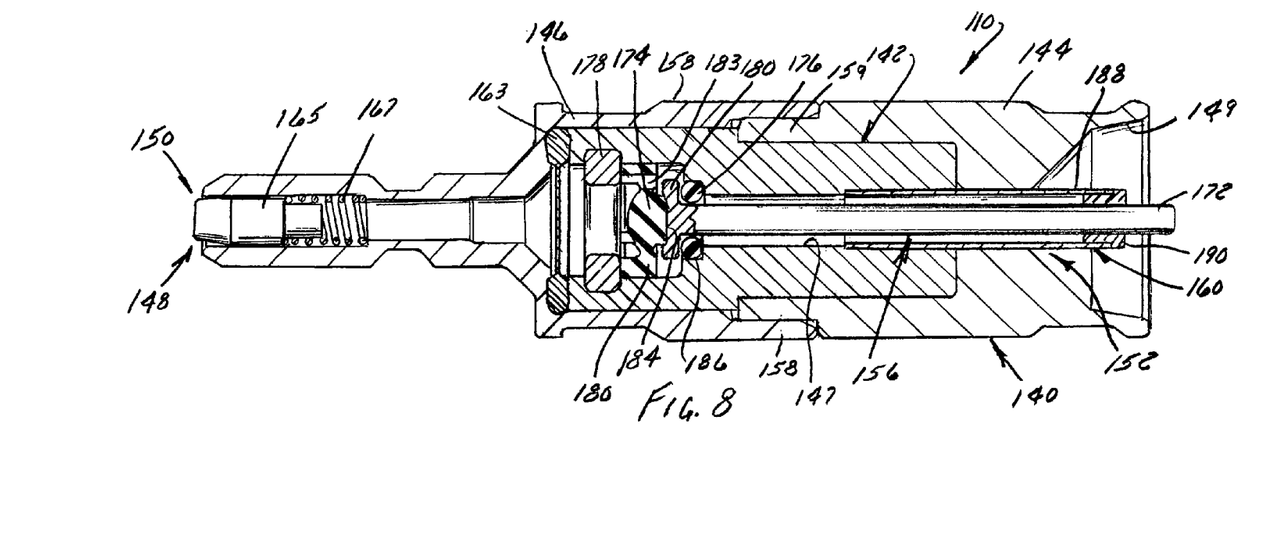
FIG. 8 is sectional elevation view of a valve constructed in accordance with a second embodiment of the invention, showing the valve in a closed position
Figure 9:
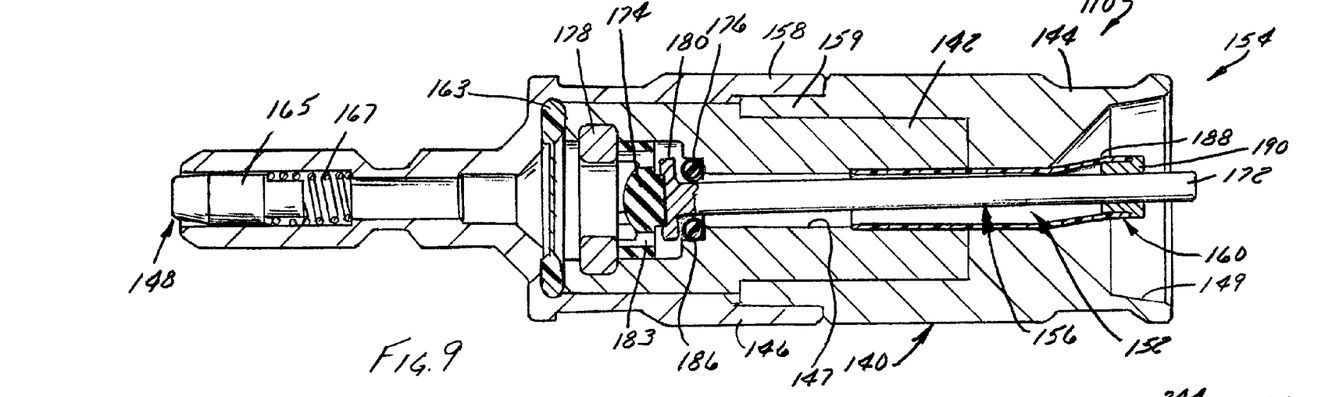
FIG. 9 is sectional elevation view of the valve of FIG. 8, showing the valve in an open or actuated position.

With reference now to FIGS. 8 and 9, a second embodiment of a valve 110 constructed in accordance with the present invention is illustrated. The valve 110 of the present embodiment is similarly constructed to that of the previous embodiment. Components of this embodiment that correspond to components of the first embodiment are illustrated by the same reference numeral, incremented by 100. The description of components of the first embodiment that are conceptually identical to corresponding components of this embodiment is considered equally applicable to the valve 110 of the present embodiment unless otherwise indicated.

The valve 110 of this embodiment, and the valves of the remaining embodiments disclosed hereinafter, differ from the valve 10 of the first embodiment in that they are adapted to contain a different type of shield that is positioned at least in part downstream of the outlet of the longitudinal bore in the housing and that is formed from a material that is resistant to being bitten into or torn by an animal.

The shield 160 of this embodiment takes the form a sheath 188 mounted over the end of the valve stem lever 172. The sheath 188 covers a length of the lever 172 extending out of the cartridge assembly 142 and into the guard 144. The sheath 188 may be constructed from a relatively elastic material such as silicone or any other suitable material. The sheath 188 is coupled to the downstream end of the lever 172 by an annular plug 190 that is inserted into the downstream end of the sheath 188 and that has a central opening through which the lever 172 passes. The opening is larger in diameter than the diameter of the lever 172 to form path between the plug 190 and the lever 172 for the passage of water.

Alternately, or in combination with this design, the sheath 188 may be perforated or be made of a water permeable material, at least in the area between outlet 152 and plug 190, hence allowing water flow through sheath 188. The sheath 188 prevents an animal from stuffing bedding material into the outlet 152 of the valve 110 to interfere with the proper operation of the valve 110. The flared opening 149 may be shaped as shown or may be flared at any angle up to and including one which is perpendicular to the centerline of the valve 110.

With particular reference now to FIG. 9, the valve 110 is shown in its actuated, open position. To actuate the valve 110, the animal engages the lever 172 of the valve stem 156 with its snout or tongue to deflect the downstream end of the lever 172 as indicated by the arrow. The sheath 188 deflects with the lever 172, retaining a seal between the sheath 188 and the guard 144. The head portion 180 of the valve stem 156 is moved from its resting, seated position and pivoted to its unseated or actuated position shown in FIG. 9. Unseating the head portion 180 relative to the diaphragm 174 allows for water to pass through the diaphragm 174 and through the bore of the valve 110, and between the lever 172 and the plug 190 and/or through the sheath 188 to allow water to flow to the outlet 152 of the bore 147 and to the animal for drinking. When the animal disengages the lever 172, the lever 172 returns to its initial resting position shown in FIG. 8, and the head portion 180 of the valve stem 156 returns to its original seated position shown in FIG. 8.

Figure 10:
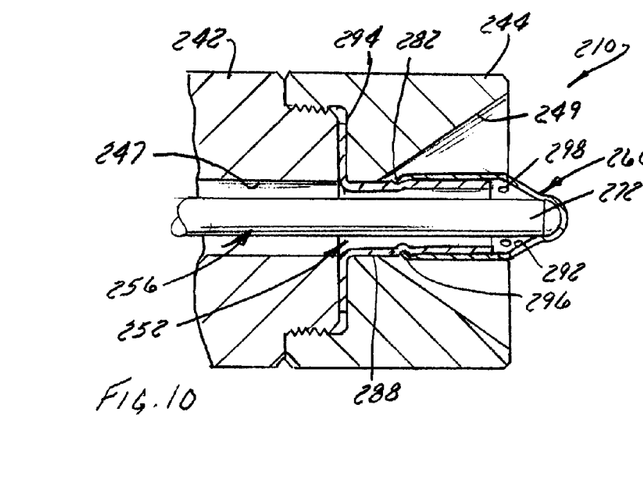
FIG. 10 is a fragmentary sectional elevation view of an outer end portion of an animal watering valve constructed in accordance with another embodiment of the invention, showing the valve in an open or actuated position.
Figure 11:
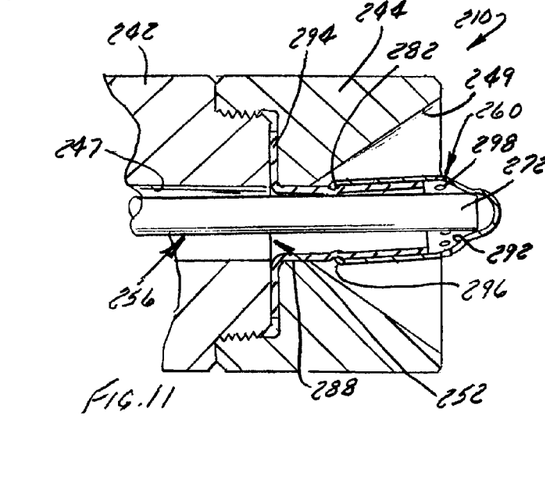
FIG. 11 is a fragmentary sectional elevation view of an outer end portion of an animal watering valve constructed in accordance with another embodiment of the invention, showing the valve in an open or actuated position.

Now referring to FIGS. 10 and 11, a third embodiment of a valve 210 constructed in accordance with the present invention is shown that differs from the valve 110 of the second embodiment in that it employs another type of shield 260 having a sheath 288 and a cover 292. The sheath 288 may be constructed from an elastomeric material and configured to flex when the lever 272 is deflected. The cover 292 may be constructed from a metal or another material that is relatively bite-resistant to prevent the animal from damaging it. While the guard 244 also is shown threaded directly to a combined valve cartridge/cap 242, it could be snap fit or otherwise attached to a cap with a valve cartridge captured therebetween. The sheath 288 is disposed over the lever 272 of the valve stem 256 and extends upstream from a point within the guard 244 to a point of engagement between the cartridge/cap 242 and the guard 244. The upstream end of the sheath 288 includes a radial flange 294 that is sealingly captured between the guard 244 and the cartridge/cap 242. The sheath 288 further includes a circumferential recess or groove 282 that is engaged by a flanged upstream end 296 of the cover 292. The cover 292 has a tapered downstream end crimped against the downstream end of the lever 272 of the valve stem 256 to assure that the cover 292 and the lever 272 move together. The cover 292 further includes a number of circumferentially spaced apertures 298 that allow water to pass therethrough when the valve 210 is moved to its open position by the animal. The cover 292 forms a seal between the valve stem 256 and the outlet 252 of the guard 244 to prevent the animal from stuffing bedding material into the valve 210 as previously described, while the apertures 298 allow for water to pass through the outlet 252 and out of the valve 210 for drinking by the animal. Alternately, or in combination with this design, the sheath 288 may be perforated or be made of a water permeable material, at least in the area between outlet 252 and the cover 292, hence allowing water flow through sheath 288. The flared opening 249 may be shaped as shown or may be flared at any angle up to and including one which is perpendicular to the centerline of the valve 210.

With particular reference now to FIG. 11, the valve 210 is shown moved to its actuated or open position. As in the valves 10 and 110 previously described herein, the valve 210 is actuated by the animal with its snout or tongue by deflecting the lever 272 of the valve stem 256. The deflection of lever 272 is limited by engagement with the side walls of the guard 244. The actuation of the lever 272 pivots the head portion (not shown) of the valve stem 256 from its seated position to its unseated position as previously described and shown as head portion 180 in FIG. 9 to allow water to pass through the diaphragm (not shown) and flow through the bore 247 of the valve 210 out of the outlet 252, and out of the valve 210 via the apertures 298 and/or through the sheath 288.

Figure 12:
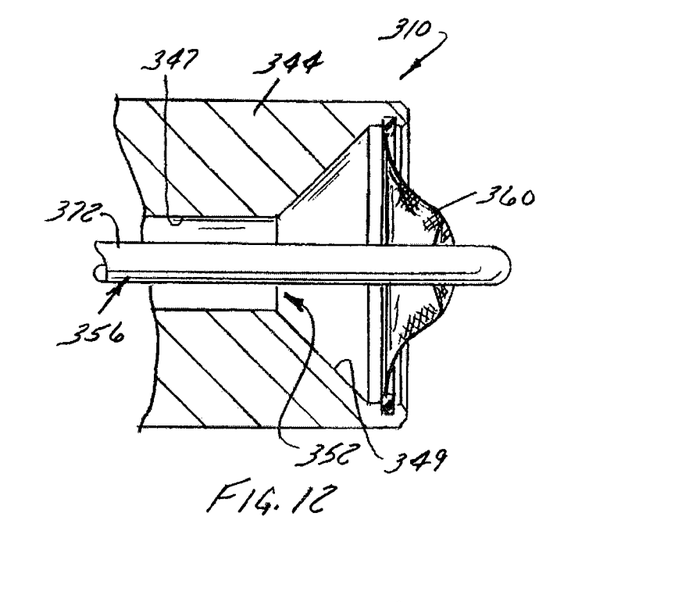
FIG. 12 is a fragmentary sectional elevation view of an outer end portion of an animal watering valve constructed in accordance with another embodiment of the invention, showing the valve in a closed position.
Figure 13:
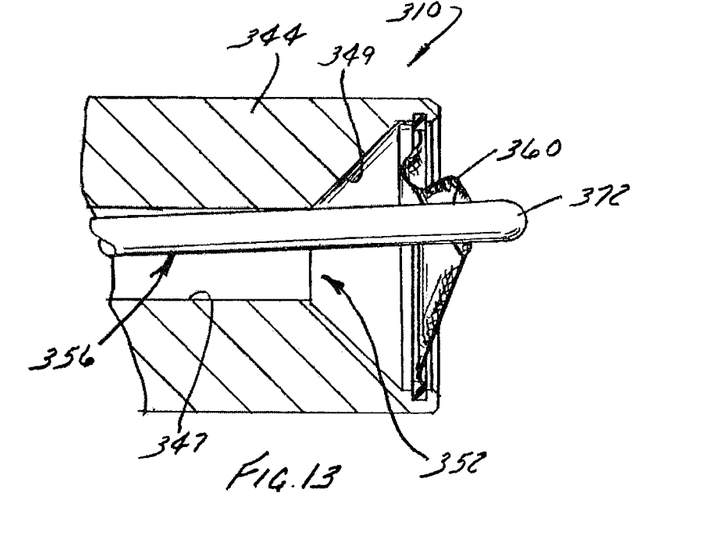
FIG. 13 is a side sectional view of the animal watering valve of FIG. 12 showing the valve in an actuated or open position.

With reference now to FIGS. 12 and 13, a fourth embodiment of a valve 310 in accordance with the present invention is illustrated. The valve 310 includes a generally elongate bore extending from the inlet (not shown) to the outlet 352. The lever 372 of the valve stem 356 is received through the elongate bore and is movable with respect to the bore to actuate the valve 310 as previously described herein. The guard 344 of the present embodiment includes a flexible screen shield 360 configured to receive the downstream end of the lever 372 or to cover the downstream end of lever 372 (not shown) along with the opening of guard 344. The screen shield 360, or at least the portion adjacent the valve stem 356, takes the form of an open mesh material that allows water to flow therethrough. The material of the screen shield 360 should be flexible yet bite resistant. A wire mesh or durable flexible plastic would suffice. The flexible screen shield 360 provides a seal over the opening defined by the guard 344 to prevent an animal from stuffing bedding material into the valve 310 as previously described.

With reference now to FIG. 13, in operation, the animal actuates the valve 310 as previously described with respect to valves 10, 110, and 210 previously described herein with its snout or tongue by moving the lever 372 of the valve stem 356. The screen shield 360 deflects to accommodate lever 372 movement. The valve 310 operates in a manner similar to the previously described embodiments whereby actuation of the lever 372 unseats the head portion (not shown) of the valve stem 356 to allow water to pass through the diaphragm (not shown), through the outlet 352 of the bore 347, and out of the valve for the animal to drink. The flexible screen shield 360 acts as a permeable membrane through which water is allowed to pass so the animal may drink from the valve 310.

Referring now to FIGS. 14-17, an animal watering valve 410 according to yet another embodiment is provided. The watering valve 410 is shown inserted through a wall of a cage 416 and mating with the water manifold 14 of FIG. 1. The valve 410 according to the present embodiment includes a housing 440 defining a longitudinal bore extending between an upstream inlet 448 and a downstream outlet 452.

The housing 440 defines a cavity for receiving a valve cartridge assembly 442 as described above. The housing 440 includes a rearwardly positioned cap 446 and a forwardly positioned guard 444 coupled to one another. The cap 446 and guard 444 may be constructed from metal or any other suitable material. The cap 446 and the guard 444 may be coupled together in a snap-fit manner as in the previous embodiments or by way of a number of engaging mechanisms or devices including threads or teeth provided on the outer surface of the guard 444 and the inner surface of the cap 446. The cartridge assembly 442 is captured between the guard 444 and the cap 446 as in the previous embodiment.

A horizontal bore 447 is positioned in the housing and includes an upstream inlet 448 and a downstream outlet 452.

The cap 446 has a generally cylindrical shape with an upstream end defining a narrower circumference than a downstream end. The upstream end of the cap 446 securely receives 1) a check seat 465 configured to prevent debris from entering the valve 410 through the inlet 448 and 2) a spring 467 for biasing of the check seat 465 to its closed position. Alternatively, check seat 465 and spring 467 could be replaced with a filter or screen of any of various designs to prevent debris from entering the valve 410. A seal 463 may be provided within the downstream end of the cap 446 to provide an elastomeric seal between cap and cartridge assembly 442. The seal 463 may comprise a flow control screen mesh, fiber filter, or sintered metal filter configured to restrict the flow rate of the valve 410.

The guard 444 is configured to prevent an animal using the valve 410 of the present embodiment from inadvertently actuating the valve 410 by stuffing, for example, bedding material into the valve 410. The guard 444 of the present embodiment may include a marking or other indicator configured to communicate to an operator of the valve 410 whether the valve 410 is installed and orientated properly. A shield in the form of cover 431 is located at a downstream end of guard 444 and closes off the valve cartridge assembly 442 to prevent the animal from inadvertently actuating the valve 410 as will be described in additional detail hereinafter. The cover 431 may be mounted in or formed integrally with the remainder of the guard 444. Cover 431 may be held in guard 444 by press fit, spring clip/ring 417, staking, or any other suitable technique. A bottom surface of the guard 444 has a vertical hole 411 formed therein for receiving a vertical stem 413. Vertical stem 413 is pivotally coupled to valve stem 456 at an end of lever 472 portion thereof upstream of the cover 413 and movably extends through the vertical hole 411. A generally horizontal hole 415, formed through the upper end portion of vertical stem 413, permits installation of the vertical stem 413 over the valve stem 456 at lever 472. The vertical stem 413 is configured for actuation by the animal with its snout or tongue.

FIG. 14 shows valve 410 in an initial or closed position in which the valve stem is centered in the bore 447. Vertical stem 413 is movable from the closed position to a raised or lowered position or may be pivoted to a side position that results in valve stem 456 movement to a position that opens the valve. This allows water to flow out of the downstream bore 447, through outlet 452, and out of the bottom of the valve to the animals through the clearance or gap between hole 411 and vertical stem 413.

Figure 16:
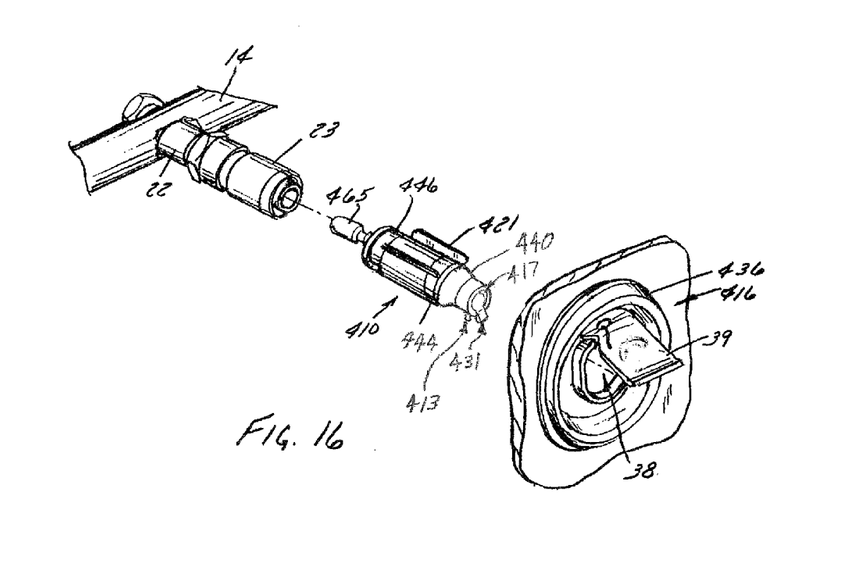
FIG. 16 is an exploded perspective view showing the animal watering valve of FIGS. 14 and 15 separated from the water manifold and the cage grommet.
Figure 17:
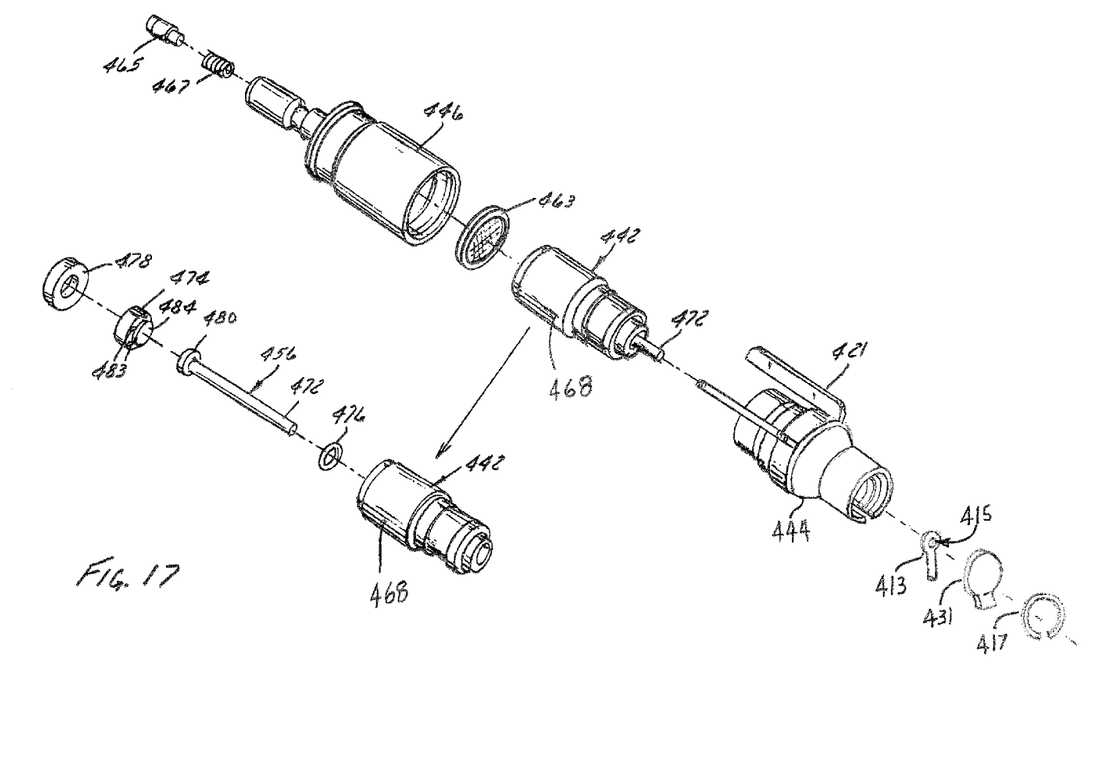
FIG. 17 is an exploded perspective view of the animal watering valve of FIGS. 14-16.

With particular reference now to FIGS. 14 and 16, a connection between the cage 416 and the inlet 448 of the valve 410 will be described in additional detail. In particular, the cage 416 comprises a cage grommet 436 through which the valve 410 extends for connection to the water manifold 14 via an intervening quick connect coupling 23 and a nipple 22 as described above in connection with FIG. 1.

One or more indexing mechanisms are provided for ensuring that the drinking valve 410 can positioned only in a predetermined manner that ensures proper orientation of the valve 410 with the stem extending downwardly. In the illustrated embodiment, the grommet 436 includes an asymmetrical opening 38. The guard 444 includes one or more radially extending indexing keys or ribs 421 that mate with the opening 38 in the grommet 436 in a specific manner that ensures that the drinking valve 410 may be inserted through the asymmetrical opening 38 in the grommet 436 only in a predetermined manner that ensures proper orientation of the valve 410 in accordance with the present embodiment. This is but one example of a mechanism to ensure the valve is properly orientated each time a cage and valve is engaged on a rack.

The valve cartridge assembly 442 may be conceptually identical or at least highly similar to that of the first embodiment. The valve cartridge assembly 442 includes a cartridge having a valve seat 486 that houses an o-ring 476, the head portion 480 of a valve stem 456, diaphragm 474, and a cartridge valve cap 478. The valve stem 456 additionally comprises a lever 472 that extends downstream and through the outlet 452 for selective actuation by the animal as has been previously described or indirectly through the actuation of the vertical stem 413 as described above in conjunction with FIGS. 14-17.

In operation, the valve 410 is initially provided in a closed position, which restricts water flow through the valve 410. In the closed position, the head portion 480 of the valve stem 456 is sealed between the diaphragm 474 and the o-ring 476 to prevent water flow therethrough. Once the lever 472 of the valve stem 456 is actuated by the animal via the vertical stem 413, the lever 472 is deflected relative to its initial position, pivoting the head portion 480 of the valve stem 456 from its seated position relative to the diaphragm 474 to an unseated position as may best be seen by reference to FIG. 15, allowing water to flow through the bore 447 of the housing 440 and out of the outlet 452 of the bore 447, between the vertical stem 413 and the vertical stem hole 411, and out of the bottom of the guard housing 440. Once the animal releases the vertical stem 413, the head 480 of the valve stem 456 returns to its initial position under the return force of the diaphragm 474 and O-ring 476, thereby also returning the valve stem 456 to its initial, seated position.

Figure 18:
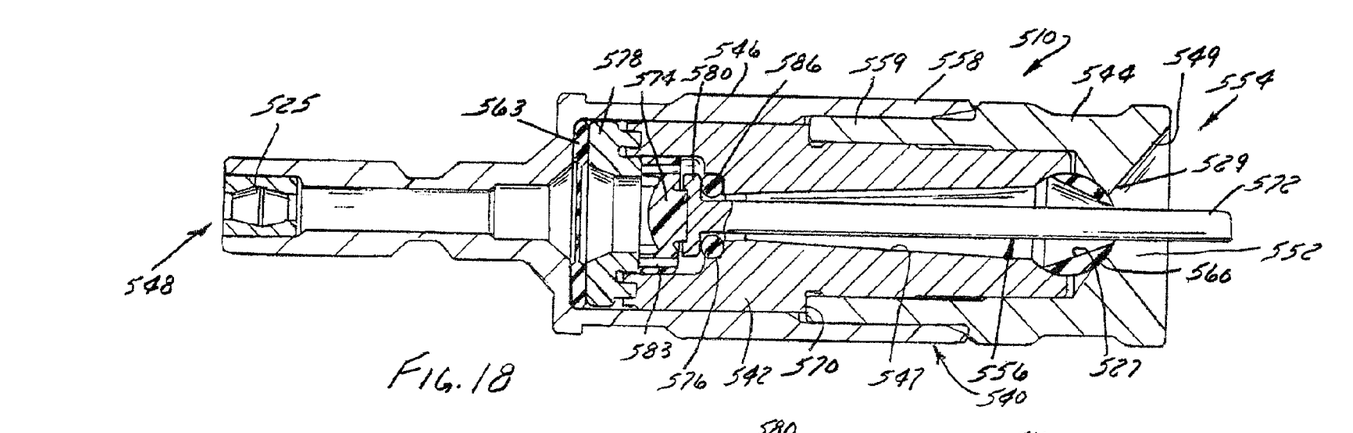
FIG. 18 is a sectional elevation view of a valve constructed in accordance with another embodiment of the invention, showing the valve in a closed position.
Figure 19:
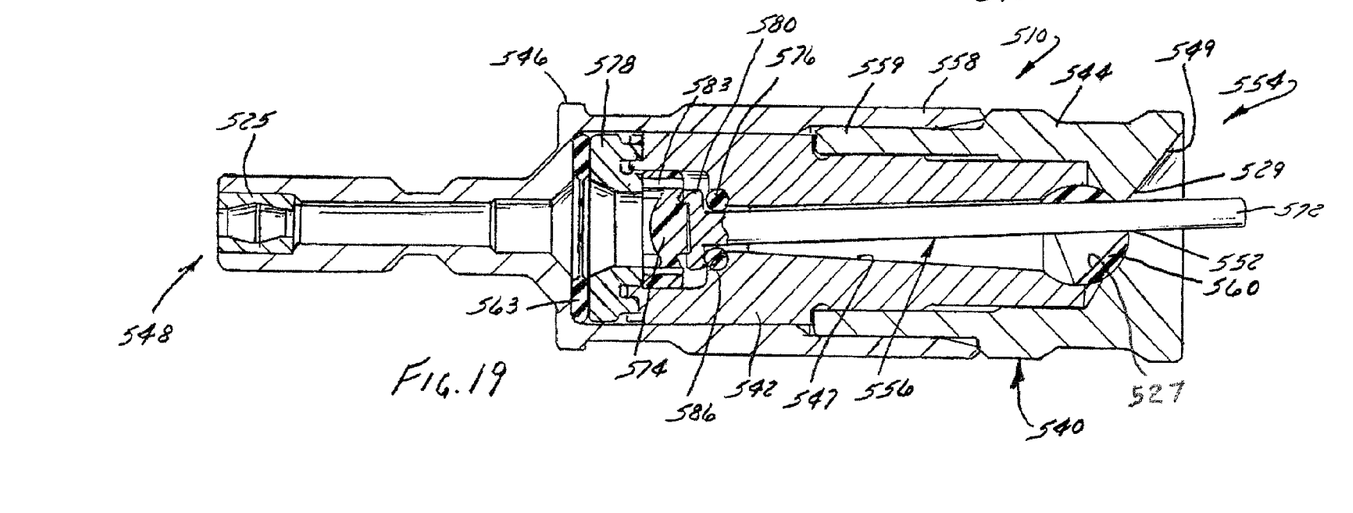
FIG. 19 is a sectional elevation view of the valve of FIG. 18, showing the valve in an actuated or open position.

Referring now to FIGS. 18 and 19, yet another embodiment of the animal watering valve 510 is illustrated. The animal watering valve 510 of the present embodiment is constructed similarly to the animal watering valves of FIGS. 1-13 and, unless otherwise indicated, the description of the valve 510 is equally applicable to the valve 10 of the first embodiment.

The valve 510 of the present embodiment comprises a two-piece housing 540 including an upstream cap 546 and a downstream guard 544. A bore 547 extends longitudinally through the housing 540 and has an upstream inlet 548 and a downstream an outlet 552. The bore 547 delivers water from the inlet 548 to the outlet 552. The cap 546 and the guard 544 may include a number of complementary teeth circumferentially arranged around the inner and outer side walls thereof, respectively, or could be snap-fit together as previously described. The housing 540 may be constructed from metal or any other suitable material and defines a cavity configured to receive a valve cartridge assembly 542. As in the previous embodiments, the cap 546 is generally cylindrically shaped and includes a relatively narrow upstream end and an opposing downstream end.

The upstream end may house an inline filter 525 constructed from a screen mesh, fiber, or sintered metal and is configured to prevent debris from entering the valve 510 through the inlet 548. The inline filter 525 may be removable for cleaning or may be replaceable. Preferably, the inline filter 525 may be removed for cleaning or disposing with or without the use of tools and without requiring the disassembly of the valve 510. The same or a similar filter could be used with the other embodiments described herein. A seal 563 configured to provide the valve 510 with flow control is disposed within the upstream end of the cap 546 downstream from the inline filter 525. The seal 563 provides an elastomeric seal and may be constructed from a screen mesh, fiber, or sintered metal. The seal 563 is preferably configured to restrict the flow rate of the valve 510 and prevents debris from entering the valve cartridge assembly 542.

The guard 544 is generally cylindrically shaped and comprises an inner diameter configured to limit the stroke of a lever 572 extending through the valve 510. The guard 544 is further configured to prevent debris from entering the valve 510 and provides a passage through which the water flows from the valve 510 to the animal drinking from the valve 510. A shield 560, taking the form of a rotatable semi-spherical ball, is provided upstream the outlet 552 and is configured to provide a seal to the end of the valve 510 to prevent debris from entering the valve 510. The shield 560 is received in a semi-spherical receptacle in the guard 544 located upstream of the valve outlet 552 and has a tapered internal bore 527 through which the lever 572 of the valve stem 556 passes. The valve stem lever 572 does not form a fluid tight seal against the bore but does provide a clearance that is sufficiently small to prevent straw or other debris from being lodged between the lever 572 and the shield 560

The valve cartridge assembly 542 is identical to the valve cartridge assembly 542 of the first embodiment and, as such, comprises a cartridge having a valve seat 586 that houses an o-ring 576, the head portion 580 of a valve stem 556, and diaphragm 574. The valve stem 556 additionally comprises the lever 572 that extends downstream and through the outlet 552 for selective actuation by the animal as has been previously described. The lever 572 is preferably received through the bore 527 in the rotatable shield 560. When the lever 572 of the valve stem 556 is deflected, the head portion 580 of the valve stem 556 pivots off the o-ring 576 to allow water to flow through the valve 510 as previously described.

In operation, the valve 510 of the present embodiment operates similarly to the valves previously described herein. In particular, the valve 510 is initially provided in a closed position in which water is prevented from flowing from the inlet 548 to the outlet 552. The animal actuates the lever 572 by deflecting the lever 572 with its snout or tongue, actuating the valve 510 as previously described. The semi-spherical shield 560 rotates upon being contacted with the shield 560, accommodating shield 560 deflection while maintaining a debris-impervious barrier between the outlet 552 of the valve 510 and the valve's interior, which drives the shield 560 to rotate. The stroke of the lever 572 is limited by engagement with an annular edge 529 of the guard 544 located adjacent the downstream end of the shield 560. As in the previous embodiment, deflection of the lever 572 opens the valve 510 to permit water to flow though the bore in the cartridge assembly 542, through the bore 527 in the shield 560, between the shield 560 and the lever 572, and out of the valve 510. The lever 572 and the shield 560 return to the initial positions upon release of the lever 572 under the biasing force of the o-ring 576 and diaphragm 574.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

We claim:

1. An animal watering valve for supplying water to an animal housed in a cage, the animal watering valve comprising:
(A) a longitudinally extending housing having an upstream-most end and a downstream-most end, the housing having a longitudinal bore formed therein, the bore having an upstream inlet and having a downstream outlet, the housing further having a flared opening formed therein having an upstream-most inlet located fluidicallly downstream of the outlet of the longitudinal bore and terminating at an outlet located at the downstream-most end of the housing, wherein the flared opening progressively increases in diameter from an upstream portion thereof to a downstream portion thereof;
(B) a diaphragm positioned within the longitudinal bore and configured to allow water to flow therethrough;
(C) a valve seat positioned within the longitudinal bore between the diaphragm and the outlet;
(D) a valve stem comprising a valve head and a lever extending downstream from the valve head and into the longitudinal bore, the valve head having an upstream surface coupled to the diaphragm and a downstream surface coupled to the valve seat, wherein the lever is selectively deflectable by an animal to move the valve head from a seated position to an unseated position relative to the valve seat to open the animal watering valve; and
(E) a shield configured to prevent an animal from lodging material into the housing and lodging the lever in a deflected position thereof, wherein at least a portion of the shield is located within the flared opening downstream of the outlet of the longitudinal bore and is resistant to being torn by the animal.

2. The animal watering valve of claim 1, wherein the housing comprises an upstream cap and a downstream guard coupled to one another.

3. The animal watering valve of claim 2, wherein the cap and the guard are snap-fit together.

4. The animal watering valve of claim 1, further comprising a valve cartridge assembly retained in a cavity in the housing.

5. The animal watering valve of claim 4, wherein the valve cartridge assembly comprises a valve cartridge housing having a cavity formed therein in which the diaphragm, the valve stem, and the valve seat are retained.

6. The animal watering valve of claim 5, further comprising a cartridge valve cap disposed in the cavity in the valve cartridge upstream of the diaphragm and holding at least the diaphragm and the valve stem in the valve cartridge housing.

7. The animal watering valve of claim 1, wherein the shield comprises an elongate sheath received over a downstream end portion of the lever.

8. The animal watering valve of claim 1, wherein the shield comprises a cover having a plurality of apertures configured to allow water to flow therethrough and received over a downstream end portion of the lever.

9. The animal watering valve of claim 1, wherein the shield comprises a flexible membrane including a centrally located aperture through which a downstream end of the lever is received and configured to allow water to pass therethrough.

10. The animal watering valve of claim 1, wherein the shield comprises a rotatable ball including a bore through which the lever is received.

11. An animal watering valve comprising:
a valve cartridge including
a valve cartridge housing having a first, innermost end and a second, outermost end, a bore extending longitudinally through the valve cartridge housing and comprising an upstream inlet located at the first end of the valve cartridge housing, and a downstream outlet located at the second end of the valve cartridge housing, and
a valve assembly located in the bore, and including, from a downstream end to an upstream end of the valve assembly, an annular valve seat, a head of a valve stem, a diaphragm, and a retainer, wherein the
annular valve seat is positioned generally adjacent the first innermost end of the valve cartridge housing and configured to receive the valve stem therethrough the valve stem positioned in the bore such that a downstream surface of the head of the valve stem rests on an upstream surface of the valve seat and such that a lever of the valve stem extends downstream of the head through the valve seat, through the bore, and out of the valve cartridge housing, the
diaphragm is positioned in the bore such a downstream surface of that the diaphragm rests against an upstream surface of the head of the valve stem, and
the retainer is positioned in the bore between an upstream surface of the diaphragm and an innermost end of the valve cartridge and holds the diaphragm, the valve stem, and the valve seat in the valve cartridge housing; and
a valve housing in which the valve cartridge is retained, the valve housing including a guard and a cap coupled together to define a cavity having a continuous inner wall that engages an outer wall of the valve cartridge with the valve cartridge retained within the cavity, the valve housing having an inlet formed in the cap in communication with the inlet of the valve cartridge housing, and an outlet formed in the guard in communication with the outlet of the valve cartridge, wherein the outlet in the guard comprises a flared opening that is located downstream of the outlet of the valve cartridge, the flared opening having an upstream portion thereof in fluid communication with the outlet of the bore in the valve cartridge and a downstream portion opening into an outlet of the animal watering valve, wherein the flared opening progressively increases in diameter from the upstream portion thereof to the downstream portion thereof.

12. The animal watering valve of claim 11, further comprising a screen between the cap and the valve cartridge to provide a seal therebetween and to filter and control the flow of water flowing therethrough.

13. The animal watering valve of claim 11, wherein the guard and the cap are snap-fit together.

14. The animal watering valve of claim 11, further comprising a shield configured to prevent an animal from lodging material into the housing and lodging the lever in a deflected position thereof, wherein at least a portion of the shield is located within the flared opening downstream of the outlet of the housing and is resistant to being torn by an animal.

15. The animal watering valve of claim 11, wherein the valve cartridge is made of one of a plastic and a metal.

16. A method of constructing an animal watering valve, the method comprising the steps of;
providing a valve cartridge including
a valve cartridge housing having a longitudinal bore extending between a first, innermost end of the valve cartridge housing and a second, outermost end of the valve cartridge housing, the bore comprising an upstream inlet located at the first end of the valve cartridge housing, and a downstream outlet located at the second end of the valve cartridge housing, a valve assembly located in the bore and including, from a downstream end to an upstream end of the valve assembly, an annular valve seat, a head of a valve stem, a diaphragm, and a retainer, wherein the
an annular valve seat is located in the bore and positioned generally adjacent the first, innermost end of the valve cartridge housing, wherein the valve seat is configured to receive the valve stem therein, the valve stem positioned in the bore such that a downstream surface of the head of the valve stem rests on an upstream surface of the valve seat and such that a lever of the valve stem extends downstream of the head through the bore and out of the valve cartridge housing,
the diaphragm is positioned in the bore such that a downstream surface of the diaphragm rests against an upstream surface of the head of the valve stem, and wherein the retainer is positioned in the bore between an upstream surface of the diaphragm and an innermost end of the valve cartridge and holds the diaphragm, the valve stem, and the valve seat in the valve cartridge housing;
and then
coupling a guard and a cap of a valve housing together to define a cavity having a continuous inner wall that engages an outer wall of the valve cartridge with the valve cartridge retained within the cavity, the valve housing having an inlet formed in the cap in communication with the inlet of the valve cartridge housing and an outlet formed in the guard in communication with the outlet of the valve cartridge, wherein the outlet formed in the guard comprises a flared opening located downstream of the outlet of the valve cartridge, and wherein the flared opening progressively increases in diameter from an upstream portion thereof to a downstream portion thereof.

17. The method of claim 16, wherein the coupling step comprises snap-fitting the cap to the guard.

18. The method of claim 16, further comprising assembling the valve cartridge assembly prior to the coupling step, the assembling operation including
inserting the valve seat in the bore;
inserting the valve stem in the bore such that the downstream surface of the head of the valve stem rests on the valve seat such that the lever of the valve stem extends downstream of the head through the bore and out of the valve cartridge housing,
inserting the diaphragm in the bore such that the diaphragm rests against the upstream surface of the head of the valve stem, and
inserting a retainer in the bore to retain at least the diaphragm, the valve stem, and the valve seat in the valve cartridge housing.

19. The method of claim 16, further comprising providing a shield, the shield configured to prevent an animal from lodging material into the housing and lodging the lever in a deflected position thereof wherein at least a portion of the shield is located within the flared opening downstream of the outlet of the housing and is resistant to being torn by an animal.

* * * * *